Sept. 7, 1937. R. MEER Re. 20,499

TEMPERING OF PLATE GLASS OR OTHER SHEETS MADE OF ANY MATERIALS

Original Filed Oct. 18, 1934

R. Meer
INVENTOR

By: Glascock Downing & Seebold
Attys.

Reissued Sept. 7, 1937

Re. 20,499

UNITED STATES PATENT OFFICE 20,499

TEMPERING OF PLATE GLASS OR OTHER SHEETS MADE OF ANY MATERIALS

Raymond Meer, Paris, France, assignor to The American Securit Company, a corporation of Delaware Original No. 1,999,337, dated April 30, 1935, Serial No. 748,938, October 18, 1934. Application for reissue April 27, 1937, Serial No. 139,328. In France May 24, 1934

7 Claims. (Cl. 49—45)

This invention relates to the tempering of sheets of any materials and particularly of plate glass or other glass sheets by means of a gas or of a mixture of gas and of vapours.

It has already been proposed to direct on both faces of a glass plate raised to softening temperature, opposed air jets having a fixed direction normal to the plane of the glass plate and to produce relative movements between the latter and the said air jets, and particularly movements of rectilinear or circular translation. It has also been proposed to cause air jets, or jets of air and water vapour to impinge or strike upon both faces of a glass plate to be tempered, the direction or incidence of the said jets on the glass plate being constantly variable.

The invention has for its object the new combination, in one unit, in a plant for the tempering of glass plates or the like by means of jets of gaseous fluid on both their faces, of means for varying the incidence of the jets, with means for producing relative movements between the totality of these jets and the glass plate to be tempered.

In thus defining the invention in its principle, by the word "jets" is meant all members having a cavity in communication either with a source of gas under pressure, or with a source of vacuum and an orifice of which is directed towards one of the faces of the glass plate to be tempered, in such a manner that a stream of gaseous fluid is maintained by blowing, or by suction. Moreover, "blown" and "sucked" jets can be juxtaposed.

According to the invention, such jets receive, relatively to the glass plate, a movement which is the resultant of the two following movements:

A first movement which causes the incidence of the "jet" to vary relatively to the face of the glass plate.

A second movement imparted to the totality of the jets, or to the glass plate, or again both to the latter and to the said jets, for producing relative movements such that, if the direction of the jets was fixed, their point or their zone of intersection with the glass plate would move on the surface of the latter.

Owing to these two combined movements, the faces of the sheet to be tempered is completely swept by a reduced number of jets and, consequently, with a small consumption of cooling fluid. Other advantageous results, indicated later on, are also obtained.

The invention, in one of its embodiments, is further characterized by the fact that the two above movements are kinematically associated and obtained from a single control.

The accompanying drawing illustrates, by way of example only, a form of construction of a plant according to the invention.

Figure 2:
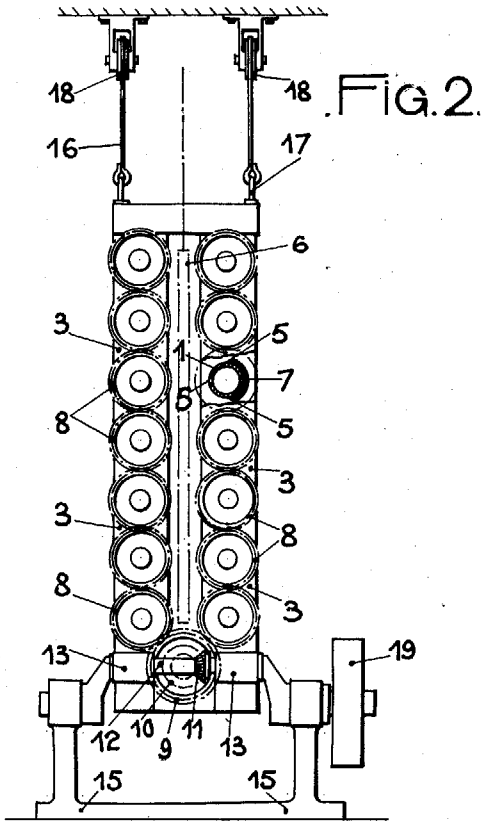
Fig. 2 is a corresponding sectional side view.
Figure 1:
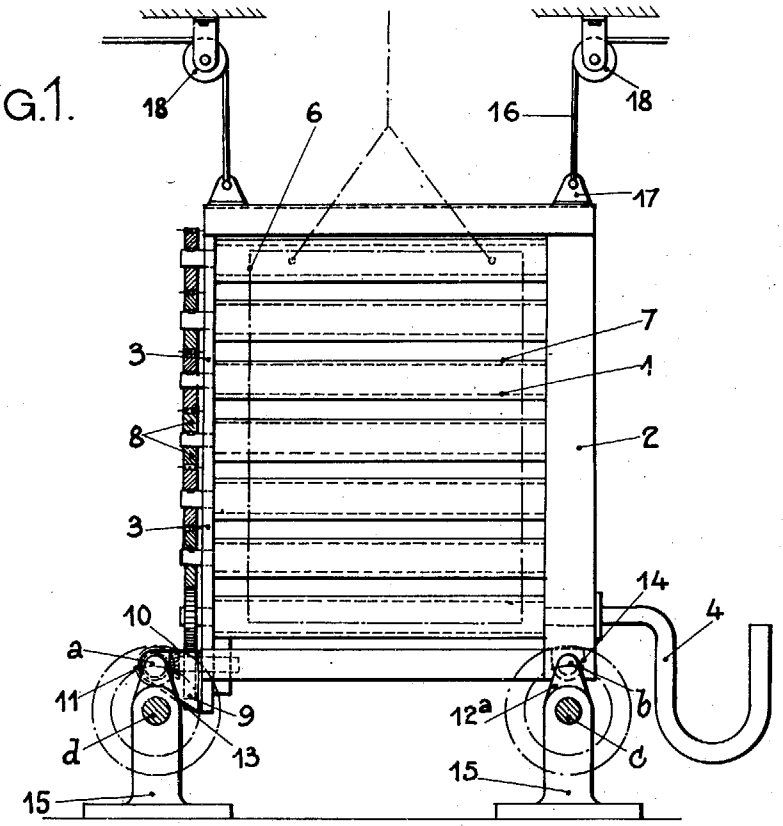
Fig. 1 is a diagrammatic general elevation, with partial sections of the plant.

In this example, on one and the same frame are provided two rows of tubes 1 arranged parallel to each other and journalled, at one end, in the wall of a casing 2 and, at the other end, in a plate 3. The interior of the tubes 1 is in communication with the casing 2, the opposite end being closed. The tubes are shown, from one row to the other, as being arranged in pairs in horizontal planes, but they might be vertically displaced so that one tube of a row is located at a level comprised between two tubes of the other row.

The casings 2 are supplied with air or other fluid through flexible pipes 4 connected to a fan, a compressor or other suitable source of supply. In the wall of the tubes 1 are provided orifices 5 angularly distributed on the periphery of said tubes and longitudinally spaced apart in such a manner that the sheet 6 to be cooled (a glass plate to be tempered for instance) is not acted upon on both its faces at two exactly opposite points. Fixed or movable deflectors can be combined with the tubes for varying, in combination with a continuous or alternating movement of rotation of the said tubes on themselves, the incidence of the fluid jets relatively to the faces of the glass plate upon which they impinge. In the example illustrated, the tubes 1 rotate in contact with outer channel members 7 which obturate the orifices 5 when they are set in such a direction that they can no longer be in contact with the glass plate.

The tubes 1 rotate on themselves, in bearings provided in the casings 2 and on the plates 3 of the frame. For that purpose, on the closed end of each of the said tubes is mounted a pinion 8 meshing with the pinion 8 of the adjacent tube. The two lower pinions mesh with a common pinion 9 journalled in a suitable bearing of the frame and angularly rigid with a bevel pinion 10 constantly gearing with another bevel pinion 11 rigidly secured on the crank pin of a crank shaft 12. The entire frame is supported by bearings 13, at the front, and by bearings 14, at the rear, on the crank pins of two similar crank shafts 12 and 12ª mounted in bearings 15.

The arrangement is such that the points

*a—b—c—d* are the apices of a parallelogram; by actuating for instance the crank shaft 12 by means of a pulley 19 connected, by a belt, to a motor or to any transmission, the frame is subjected to horizontal oscillations combined with vertical oscillations of the same amplitude determined by the radius of the crank shafts. On the other hand, during its continuous gyratory movement about the point *d*, the pinion 11 imparts to the pinion 10 and, consequently, to the pinion 9 and to the tubes 1, a continuous movement of rotation. The angular speed of the tubes can be determined at will relatively to that of the crank shafts, by choosing the diameters of the various pinions.

The frame is preferably balanced by means of counterweights (not shown) which act on cables 16 attached at 17 and passing on transmission pulleys 18. When the invention is applied to the tempering of plate glass, a tempering is obtained with a very small consumption of cooling fluid per weight unit of glass treated, which tempering gives products remarkable as regards security when they are used as glass plates on motor vehicles. Shocks divide them into fragments, the size of which varies from that of a pea to that of a grain of wheat. This appears to result from the fact that the glass plate is swept throughout the area of its faces by jets the points or zone of impact of which are never exactly opposite from one face to the other and that one and the same jet, according to its incidence, differently cools the zone upon which it impinges.

An arrangement in which the jets movable or fixed relatively to the frame carrying them, are never exactly opposite from one face to the other of the glass plate, is included in the scope of the invention.

The invention is not limited to the embodiment described and illustrated. It is defined in its principle by the features set forth in the preamble to the present specification and includes in its scope all the means and combinations of means suitable for carrying these features into practice.

What I claim as my invention and desire to secure by Letters Patent is:—

1. In a plant for the tempering of materials in sheet form and particularly of plate glass by projection of jets of gaseous fluid on both their faces, the combination of first means for varying the incidence of the jets and of second means for producing relative movements between the totality of these jets and the glass plate to be tempered.

2. In a plant for the tempering of materials in sheet form and particularly of plate glass by projection of jets of gaseous fluid on both their faces, the combination of first means for varying the incidence of the jets, of second means for producing relative movements between the totality of these jets and the glass plate to be tempered, of a source of power for actuating the above mentioned means, and of third means for kinematically connecting said first means and said second means.

3. In a plant for the tempering of materials in sheet form and particularly of plate glass by projection of jets of gaseous fluid on both their faces, the combination of first means for varying the incidence of the jets, of second means for producing relative movements between the totality of these jets and the glass plate to be tempered, of a source of power for actuating the above mentioned means, and of third means for kinematically connecting said first means and said second means, the jets never being exactly opposite each other from one face to the other of the glass plate.

4. In a plant for the tempering of materials in sheet form and particularly of plate glass by projection of jets of gaseous fluid on both their faces, the combination of a casing, of a plate, of two series of tubes parallel to each other and journalled, on the one hand, in one of the walls of the casing and, on the other hand, in the said plate, the said tubes being in communication with the casing, at one end, and being closed at the other end, of means for supplying the casing with compressed air, orifices provided in the walls of the tubes, angularly distributed on their periphery and longitudinally spaced apart in such a manner that a sheet to be tempered, arranged between both series of tubes, is never acted upon on both its faces by the jets at two exactly opposite pivots, means for causing the tubes to rotate and, accessorily, deflectors for modifying the incidence of the said jets.

5. In a plant for the tempering of materials in sheet form and particularly of plate glass by projection of jets of gaseous fluid on both their faces, the combination of a casing, of a plate, of at least one crank shaft on which are pivoted the casing and the plate which are rigidly connected, of means for actuating the crank shafts and thereby imparting a corresponding movement to the plate and to the casing, of two series of parallel tubes journalled, on the one hand, in one of the walls of the casing and, on the other hand, in the said plate, the said tubes being in communication with the casing, at one end, and being closed at the other end, of means for supplying the casing with compressed air, orifices provided in the walls of the tubes, angularly distributed on their periphery and longitudinally spaced apart in such a manner that a sheet to be tempered, arranged between both series of tubes, is never acted upon on both its faces by the jets at two exactly opposite points, toothed wheels rigid with the tubes and successively put into gear, an end toothed wheel driving the said toothed wheels, a first bevel pinion driving the said toothed wheel, and a second bevel pinion gearing with the first pinion which it drives owing to the movement of the crank shaft, the second pinion being mounted on the crank pin of the crank shaft.

6. The method of tempering glass sheets or articles which consists in heating the sheet or article to approximately its softening point and rapidly cooling the surface of said sheet or article by applying to its surface a blast or stream of cooling fluid, and varying the angle of incidence of said blast on said surface.

7. Apparatus for tempering glass sheets or other articles comprising means for heating said sheet or article to approximately its softening point, means located adjacent the surface of the article provided with nozzles adapted to project a cooling fluid upon the surface of the sheet or article, means for admitting cooling fluid to the nozzles, and means for moving the nozzles at varying angles of incidence in respect to said surface.

RAYMOND MEER.